Sept. 1, 1931. L. KIRSCHBRAUN 1,821,552
ROOFING AND METHOD OF MAKING SAME
Filed March 19, 1929
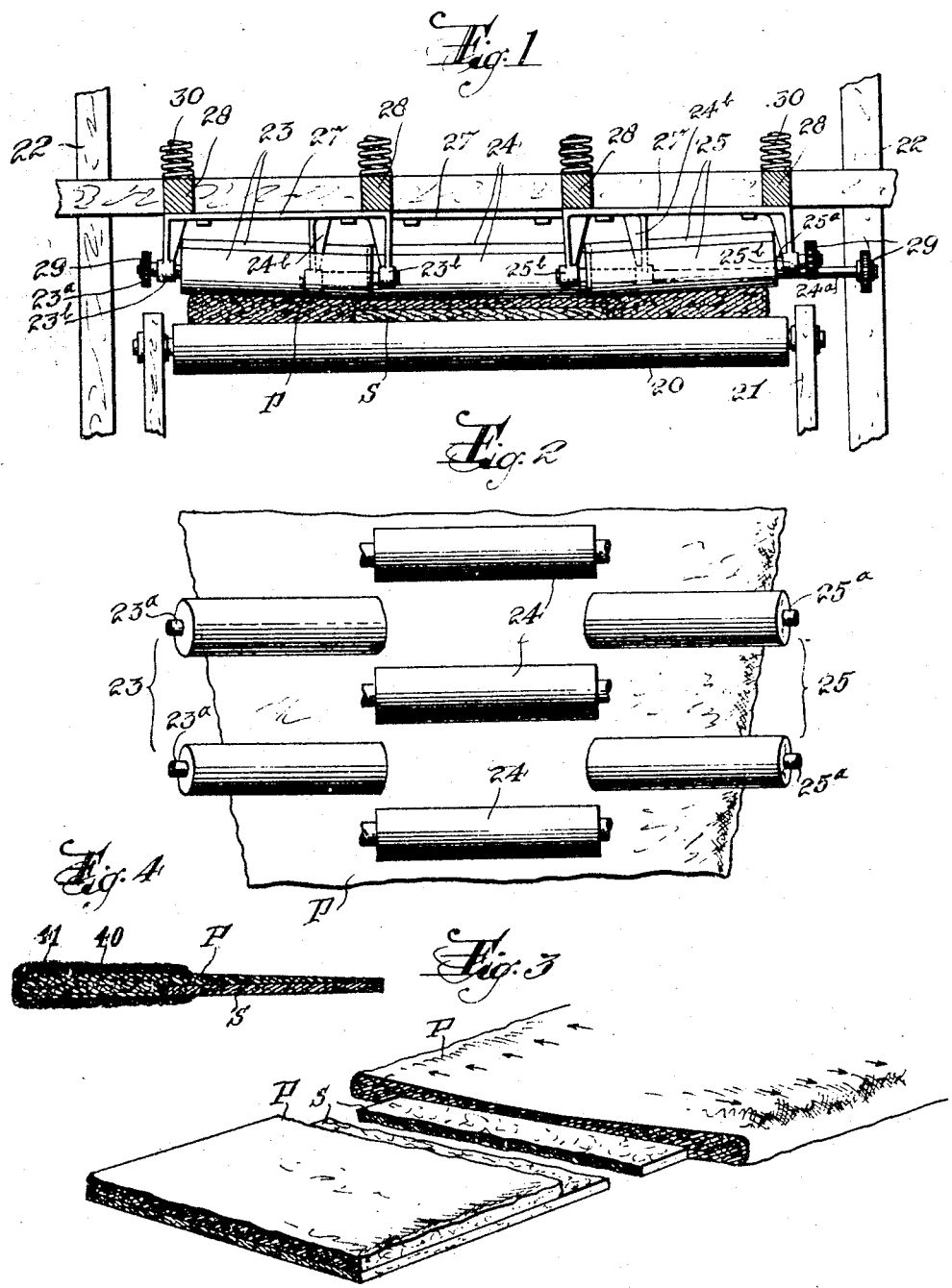
INVENTOR
Lester Kirschbraun
BY
Samuel Stearman
ATTORNEY Patented Sept. 1, 1931

1,821,552

UNITED STATES PATENT OFFICE

LESTER KIRSCHBRAUN, OF LEONIA, NEW JERSEY, ASSIGNOR, BY MESNE ASSIGNMENTS, TO THE PATENT AND LICENSING CORPORATION, OF BOSTON, MASSACHUSETTS, A CORPORATION OF MASSACHUSETTS

ROOFING AND METHOD OF MAKING SAME

Application filed March 19, 1929. Serial No. 348,297.

This invention relates to building material and is concerned more particularly with an improved method of making composition building material which can, by suitable cutting operations, be formed into shingles or strips for roofing purposes, or into boards for siding, etc.

Proposals have heretofore been made for manufacturing roofing material composed of plastic waterproofing material such as asphalt combined with hardening and other ingredients. These suggestions have generally been directed towards the production of the roofing in the form of a core of the hardened plastic material enclosed between jackets or facing sheets of fibrous material such as saturated felt or the like. A product of this character, however, is quite costly, for although the core itself can be made from relatively inexpensive material, the cost of the whole is greatly increased by the cost of the felt facing sheets. Furthermore, observations of roofing material of this type, when subjected to actual weather conditions, indicate that it is open to certain objections, chief of which is the tendency of the jackets or facing sheets to separate or delaminate in time from the core material, with the result that the facing sheets stand off from the core and lend a very unsightly appearance to the roof.

I have found that where hardened plastic material of bituminous nature is employed as the roofing base, there is no real need for having facing sheets extending entirely over both faces of the core for the reason that the hardened plastic material if partially reinforced, is capable of sustaining its form during handling as well as when applied on a roof under actual weather conditions. Thus, by omitting the facing sheets from at least the weather exposed portions of the roofing, the cost of the product is materially reduced, the tendency towards delamination is eliminated and the possibility of an unsightly roof is avoided. Furthermore, by omitting facing material from the weather exposed portions as well as from the unexposed areas of the uppermost face of the roofing, there is the additional advantage that when the product is applied to the roof there will ensue, in time, an effective sealing action between overlying elements by virtue of the fact that the heat of the sun will render the elements sufficiently adhesive to permit union between adjacent contacting surfaces, particularly when one or both of these contacting surfaces are provided with a superficial layer of asphalt or similar adhesive waterproof coating material, to thus aid in holding the exposed portions in intimate contact with the underlying surface.

Although there are certain disadvantages from a practical point of view, to jackets or facing sheets affixed to the exposed portions of the roofing, as above pointed out, it is nevertheless desirable to provide a portion of at least one of the faces of the product with facing material, particularly where the element is formed with a tapering cross-section resembling that of wooden shingles. In forming tapered elements, the upper or thinner ends thereof are generally more flexible or pliable than the lower or thicker ends thereof and the relatively limp character of the upper portions of the elements renders them rather difficult to handle, unless provision be made for reinforcing the upper thin ends so as to compensate at least to some extent for their otherwise limp character. Furthermore, there is some tendency of the plastic material at the thinner areas of the elements to sag, particularly in the region of and immediately around the securing nails passing therethrough. On account of this tendency of the plastic material to sag about the nail holes, there is likelihood of the shingle pulling away in time from its holding nails, unless the portion of the shingle through which the securing nails pass is properly reinforced. It is also desirable, in the processing of the shingle, to employ a sheet of fibrous material to act as a carrier for the plastic material during at least the earlier formative stage thereof.

Accordingly, I have concluded that roofing of this type may be improved and the cost thereof considerably lessened by providing reinforcing sheets to extend over the upper portion of either the under or upper face of the element, or both.

My object, therefore, is to produce roofing material having the entire thickness of its exposed portions built up of hardened plastic material, and having the unexposed portions thereof formed partly of hardened plastic material and partly of a layer or layers of fibrous felt preferably saturated with waterproofing material, and adapted to reenforce the unexposed portions of the roofing for the purposes above mentioned, the fibrous felt thus employed as a reinforce serving also as a carrier for the plastic material during its formative stages.

In carrying my invention into practise, one face of a strip or web of fibrous material such as saturated felt is supplied with a relatively thick layer of plastic material, and the web carrying the plastic material is then subjected to pressure, preferably by passing the web and its overlying layer of plastic through a series of pressure applying stages, adapted to act upon the plastic material in such a way that portions thereof are gradually forced outwardly in a lateral direction beyond the marginal edges of the fibrous web and if desired, the portions thus transferred beyond the marginal edges may be acted upon so as to cause them to assume a cross-section of gradually increasing thickness towards the lateral extremities thereof. After the mass of plastic has been thus extended sidewise and compacted to the desired extent, the sheet may be slitted longitudinally and preferably through the center thereof so as to form two separate sections, each section being composed of plastic material for the greater portion of the widthwise extent thereof, and having its remaining portions occupied by a strip of fibrous material having an adherent layer of plastic material or by plastic material of reduced cross-section interposed between strips of fibrous material. From the separate sections thus produced, shingles or shingle strips, or the like, may be formed by severing the sections transversely thereof at intervals corresponding to the width of elements desired.

Where the pressure for forming the plastic mass into desired shape is applied in successive stages, so as to force the plastic material gradually outwardly beyond the marginal edges of the fibrous web the plastic layer thus gradually built up beyond the marginal edges of the fibrous web, takes on a more or less rough and uneven configuration, and inasmuch as these marginal edges are adapted to form the exposed butt edges of roofing elements cut from the sheet, these butt-edges, when the elements are laid up on a roof, present a very desirable uneven outline increasing the shadow-casting possibilities thereof and enhancing the appearance of the roof as a whole.

The invention will be more clearly understood from the description to follow and from the accompanying drawings, in which Fig. 1 is a view, partly in section and partly in elevation, of an arrangement of mechanism that may be employed in accordance with my invention.

Fig. 2 is plan view illustrating the progress, through several stages of material as treated by my invention.

Fig. 3 is a view in perspective, illustrating the appearance of the material at several stages.

Fig. 4 is a transverse section through one form of roofing element that may be produced according to invention.

In carrying out the invention in its preferred form, a continuous web of fibrous material S, such as asphalt saturated felt, is fed horizontally from a convenient supply, as for example a roll thereof, over a table or other support, and a mass of plastic material is superimposed over the travelling web so as to form a layer of substantial thickness and of a width substantially equal to that of the web. The plastic material employed in accordance with the process, is composed of a homogeneous mass of bitumen of any suitable degree of hardness, fibers of any desired kind, and mineral or other types of filler the composition of the mix being such that it is plastic at elevated temperatures and when cooled to normal temperatures sets to a hard non-brittle, more or less rigid structure. The ingredients are mixed and agitated in any form of apparatus suitable for the purpose, the agitation being continued until the required or desired degree of homogeneity is secured. The plastic mass may, with considerable advantage, be produced by macerating and agitating roofing waste such as usually accumulates at a roofing plant, other ingredients being mixed with the waste, when necessary or desirable, in order to form the mass of desired composition and consistency. A plastic mass made from roofing scrap will ordinarily contain about 15 to 20% fibrous material, 55 to 60% of asphalt of a melting point between 100 and 200° F., and about 25 to 35% mineral matter in the form of slate dust, mica, crushed slate or the like. According to my present invention, I prefer to compound with the above constituents about 10% of gilsonite in order to increase the hardness and rigidity of the structure while precluding any substantial brittleness therein.

After the plastic mix has been conditioned to the required consistency, it may then be sheeted in any convenient way and applied to the travelling web of saturated felt. Advantageously, the plastic material may be extruded under pressure through dies so shaped as to form the material into a continuous sheet of desired thickness of a width corresponding substantially to that of the web S, the extrusion mechanism being located in proximity to the web so that the extruded length of plastic material may be applied to a face of the web directly as the former emerges from the extruding device. The plastic mass may also, if desired be calendered on to the web S by means of calender rolls or other suitable mechanism. Since the plastic mass is in warm and adhesive condition when brought into contact with the web S, there is sufficient adhesion between the two to enable the plastic to become securely affixed to the web so that the latter may serve as a carrier for the plastic in the further operations thereon.

In Fig. 3, I have shown (near the lower end thereof) the plastic material P as it appears when first united to the web S, at which stage, as already noted, the web and the layer of plastic are substantially equal in width. The remaining portions of Fig. 3, indicate the effects produced in subsequent formative stages of the material when operated upon in accordance with the preferred form of invention for forcing portions of the plastic material laterally so as to transfer the same to positions beyond the marginal edges of the web S.

In order to accomplish the aforegoing, according to the preferred mode of operation, the web carrying the plastic on its upper face is fed over a series of horizontal bed rolls 20 journalled idly in suitable framework 21. Mounted above the bed rolls 20, and supported from suitable framework 22, are a number of series of aligned pressure rolls 23, 24, 25, the intermediate series being arranged axially parallel with the bed rolls 20, and the series 23 and 25 being preferably arranged with their axes at an angle to the horizontal so as to taper the plastic material laterally along spaced zones, as shown. The rolls of the intermediate series 24, are also preferably arranged in staggered relation with respect to those of series 23 and 25 in the direction of forward travel of the web, the inner ends of rolls 23 and 25 slightly overlapping the adjacent outer ends of the intermediate series 24. The pressure rolls of the several series are fixed to shafts 23a, 24a, 25a, respectively, journalled individually in bearings 23b, 24b, 25b formed integrally with brackets 27 which depend from supporting members 28 of the framework 22. Suitable drive connections 29 are fixed to one end of each of the several shafts so as to drive the pressure rolls at any desired speed. In order to provide for gradually increasing the pressure upon the plastic material as it passes beneath successive rolls, the shafts of succeeding rolls in each series may be mounted above the bed rolls 20 at vertical distances decreasing by slight increments in the direction of forward travel of the web. If desired, also, the supporting members carrying the bearing brackets 27 may be floatingly mounted under tension of springs 30 or other tensioning means, whereby the pressure imposed on the plastic material is gradually increased in the progressive forward movement of the web.

The pressure rolls as well as the bed rolls are preferably also arranged to be heated, as by steam internally thereof, so as to prevent the plastic material from adhering to the surface thereof. Alternatively, for this purpose, the rolls may be sprayed or otherwise supplied with a suspension of non-adhesive material, as for example, a suspension of clay in water.

The operation of the mechanism described will be apparent. Suffice it to say however, that the gradually increasing pressure upon the plastic material overlying the web S, will force and transfer quantities of the plastic material laterally beyond the margins of the web, where the plastic material will accumulate and be built up to required shape by the series of rolls 23, 25 as the pressure centrally of the web increases, the operation thus serving gradually to reduce the plastic material overlying the web and gradually to extend the width of the sheet of plastic for considerable distances beyond the marginal edges of the web, as clearly illustrated in the drawing. In thus gradually transferring the plastic material sidewise, the marginal edges thereof, under the action of the lateral series of press rolls, will be formed in more or less uneven outline, so that when shingles or other elements are severed from the finished sheet, the lower or butt edges thereof will present a desirable rough or irregular appearance.

The number of press rolls in each series will obviously depend upon the thickness of the plastic layer desired and the degree to which it shall be extended laterally.

After the sheet has passed beyond the last pressure stage, it may be coated on one or both surfaces thereof with a layer of molten asphalt, or similar adhesive material, preferably of water and weatherproof nature, into which comminuted or granular surfacing material may be partially embedded to provide the same with a wear surface of decorative finish, whereupon the surfaced sheet may be slit longitudinally through its median line to form two strips or sections. From the separate sections formed by the slitting operation, shingles, shingle strips, or other elements of desired width may be produced by severing the sections transversely thereof along desired line.

If desired, also, the separation of shingles or shingle strips may precede the coating and surfacing operations. In this case, the separated elements may then be coated with asphalt or the like on one or both faces thereof or on one or both faces of the exposed portions thereof, as by immersing the elements to the desired depth in a bath of the coating material, and subsequently applying comminuted or granular surfacing material, of any desired character and color, to the coated areas of the elements. Shingles as thus produced are illustrated in the cross-sectional view of Fig. 4. As there shown, the plastic layer P is of tapered cross-section with the felt reinforcing sheet S attached to the upper part of lower face of the element and with a layer 40 of waterproof coating material completely surrounding the lower or exposed surfaces and edges of the element including the lower portions of the felt reinforcement S, and crushed, mineral surfacing material partially imbedded in the coating layer.

While I have described as a preferred embodiment of the invention, an operation in which the plastic material forming the main body of the product, is transferred beyond the marginal edges of the web by subjecting the plastic material overlying the web to a plurality of successively increasing pressure stages, it should be apparent that the desired results may be attained by shaping the plastic material in a suitable form of flat press or mould. This type of operation however, does not lend itself to continuous operation and is accordingly not as desirable as the preferred mode of operation described in detail above.

Furthermore, while I have referred, in the preferred embodiment of the process, to the use of only one web, of fibrous material, resulting in a product reinforced along a portion of one face only thereof, it will be obvious, that where a product carrying facing sheets on portions of both faces thereof is desired, another web may be supplied so as to overlie the layer of plastic material P. The overlying web may be supplied either immediately after the plastic material has been deposited on the web S, or at any convenient subsequent stage of the operation. The overlying web may be of the same width as web S, in which case, obviously, the completed product will have the facing sheets on opposite faces thereof equally dimensioned, or, the overlying web may be narrow or wider than web S, in which case, the facing sheet on one face of the finished product will extend a greater distance from the upper edge thereof than does the sheet on the opposite face thereof. In the last named operation, the width of the sheets will preferably be such that the underface of the completed elements will carry the facing sheet of larger dimension, while the upper face will be provided with facing material extending only a comparatively short distance from the upper edge of the element, with the further provisions that neither facing sheet shall be of sufficient dimensions to constitute any material portion of the exposed areas of the completed elements, but shall be at least sufficient in extent to be penetrated by the nails for securing the elements to the roof.

I claim as my invention:

1. In a method of forming shingles, the steps which comprise supplying one face of a fibrous web with a layer of plastic material and subjecting said plastic material to pressure whereby to cause a substantial portion of said plastic material to move laterally of and beyond the marginal edges of the web.

2. In a method of forming shingles, the steps which comprise supplying one face of a fibrous web with a layer of plastic material and subjecting said plastic material during the progressive forward movement of the web, to pressure whereby to cause a substantial portion of said plastic material to move laterally of and beyond the marginal edges of the web.

3. In a method of forming shingles, the steps which comprise supplying one face of a web of fibrous material with a layer of plastic material of a width substantially that of the web, and subjecting said plastic material during the progressive forward movement of the web to pressure whereby to express plastic material from the face of the web to gradually increasing extent beyond the marginal edges thereof.

4. In a method of forming shingles, the steps which comprise supplying one face of a web of fibrous material with a layer of plastic material of a width substantially that of the web, and subjecting said plastic material during the progressive forward movement of the web to pressure whereby to reduce the cross-sectional thickness of plastic material overlying the web and transfer excess plastic material laterally beyond the marginal edges of the web.

5. In a method of forming shingles, the step which comprises supplying one face of a fibrous web with a layer of plastic material, and passing said web carrying the plastic layer through stages of gradually increasing pressure applied substantially perpendicularly to the face of the web and without lateral confinement of the plastic material, whereby to force the plastic material outwardly to gradually increasing extent beyond the marginal edges of the web.

6. In a method of forming shingles, the steps which comprise supplying one face of a fibrous web with a layer of plastic material subjecting said plastic material during the progressive forward movement of the web, to pressure whereby to cause a substantial portion of said plastic material to move laterally of and beyond the marginal edges of the web, and forming the plastic material beyond the marginal edges of the web into a tapered cross-sectional thickness.

7. In a method of forming shingles, the steps which comprise supplying one face of a web of fibrous material with a layer of plastic material of a width substantially that of the web, subjecting said plastic material during the progressive forward movement of the web to pressure whereby to reduce the cross-sectional thickness of plastic material overlying the web and transfer excess plastic material laterally beyond the marginal edges of the web and forming the plastic material beyond the marginal edges of the web into a tapered cross-sectional thickness.

8. In apparatus of the character described means for supporting a web of fibrous material carrying a layer of plastic bituminous material on one of its faces, and means adapted to act upon said plastic material for causing a substantial portion thereof to move laterally of and beyond the marginal edges of said web.

9. In apparatus of the character described means for supporting a web of fibrous material carrying a layer of plastic bituminous material on one of its faces and means for progressively transferring plastic material from said face of the web to a position beyond the marginal edges thereof.

10. In apparatus of the character described means for supporting a web of fibrous material carrying a layer of plastic bituminous material on one of its faces, and means for progressively transferring plastic material from said face of the web to a position beyond the marginal edges thereof, said last named means being arranged to form the plastic material beyond the marginal edges of the web into tapered cross-section.

11. In apparatus of the character described means for supporting a web of fibrous material carrying a layer of plastic bituminous material on one of its faces, and a plurality of series of rolls aligned in the direction of the length of the web, and adapted for progressively transferring plastic material from said face of the web to a position beyond the marginal edges thereof.

12. In apparatus of the character described means for supporting a web of fibrous material carrying a layer of plastic bituminous material on one of its faces, and a plurality of series of rolls aligned in the direction of the length of the web, and adapted for progressively transferring plastic material from said face of the web to a position beyond the marginal edges thereof, some of said series of rolls being positioned beyond the marginal edges of the web.

13. In apparatus of the character described means for supporting a web of fibrous material carrying a layer of plastic bituminous material on one of its faces, a plurality of series of rolls aligned in the direction of the length of the web, and adapted for progressively transferring plastic material from said face of the web to a position beyond the marginal edges thereof, some of said series of rolls being positioned beyond the marginal edges of the web and being arranged to form the plastic material beyond said marginal edges into tapered cross-section.

14. In apparatus of the character described means for supporting a web of fibrous material carrying a layer of plastic bituminous material on one of its faces, and a plurality of series of rolls aligned in the direction of the length of the web, and adapted for progressively transferring plastic material from said face of the web to a position beyond the marginal edges thereof, the rolls of each series being arranged progressively nearer said supporting means in the direction of forward travel of the web.

15. In apparatus of the character described means for supporting a web of fibrous material carrying a layer of plastic bituminous material on one of its faces, and a plurality of series of rolls aligned in the direction of the length of the web, and adapted for progressively transferring plastic material from said face of the web to a position beyond the marginal edges thereof, the inner series of rolls being arranged axially parallel with the web and the outer series of rolls being arranged with their axes at an angle to the web.

16. In apparatus of the character described means for supporting a web of fibrous material carrying a layer of plastic bituminous material on one of its faces, and a plurality of series of rolls aligned in the direction of the length of the web, and adapted for progressively transferring plastic material from said face of the web to a position beyond the marginal edges thereof, some of said series of rolls being positioned beyond the marginal edges of the web and arranged axially at an angle to said supporting means.

Signed at Rutherford, in the county of Bergen and State of New Jersey, this sixteenth day of March, A. D. 1929.

LESTER KIRSCHBRAUN.